United States Patent [19]
Niimura

[11] Patent Number: 5,687,386
[45] Date of Patent: Nov. 11, 1997

[54] CHARACTER INPUT APPARATUS

[75] Inventor: Takashi Niimura, Hino, Japan

[73] Assignee: Casio Computer Co., Ltd., Tokyo, Japan

[21] Appl. No.: 383,210

[22] Filed: Feb. 2, 1995

[30] Foreign Application Priority Data

Feb. 18, 1994 [JP] Japan ................................. 6-021305

[51] Int. Cl.⁶ ....................................... G06F 15/00
[52] U.S. Cl. ................................................. 395/781
[58] Field of Search ................... 364/419.09; 395/151, 395/779, 780, 781, 798; 345/141, 142, 143

[56] References Cited

U.S. PATENT DOCUMENTS

| 5,319,358 | 6/1994 | Martinez et al. | 395/141 |
| 5,412,771 | 5/1995 | Fenwick | 395/150 |

FOREIGN PATENT DOCUMENTS 62-282381  12/1987  Japan.

Primary Examiner—Phu K. Nguyen
Attorney, Agent, or Firm—Frishauf, Holtz, Goodman, Langer & Chick

[57] ABSTRACT

A character input apparatus contains a ROM that stores the character change pattern for each character according to where the character is in a string of characters, and a character reader for reading the characters before and after the entered character. When a character is entered from an input unit, the characters before and after the entered character are read by the character reader, and the change patterns corresponding to the entered character and the characters before and after the entered character are read from the ROM. This makes it possible to enter such concatenated characters as those written in one stroke, and further enter characters in a language where the form of each character changes according to the preceding and succeeding characters.

12 Claims, 7 Drawing Sheets

FIG.2

13 ROM

| ARABIC ALPHABET | BASIC FORM | WORD-BEGINNING FORM | WORD-INSIDE FORM | WORD-END FORM |
|---|---|---|---|---|
| ALIF * | ا | ا | ـا | ـا |
| BĀ | ب | بـ | ـبـ | ـب |
| TĀ | ت | تـ | ـتـ | ـت |
| ⋮ | | | | |
| SHĪN | ش | شـ | ـشـ | ـش |
| ⋮ | | | | |
| LĀM | ل | لـ | ـلـ | ـل |
| ⋮ | | | | |
| TA' MARBOTA * | ة | | | ـة |
| ALIF + LĀM | لا | | | ـلا |

CHARACTER INPUT APPARATUS

BACKGROUND OF THE INVENTION

1. Field of the Invention

This invention relates to a character input apparatus such as an electronic pocket notebook in which character data is entered and managed, and more particularly to a character input apparatus which displays and manages languages which use concatenated characters such as those written in one stroke.

2. Description of the Related Art

In the field of character input apparatuses including word processors and electronic pocket notebooks, such apparatuses as can deal with various languages such as Japanese or English have been put to practical use. They display, print, store, and manage the entered characters. Such character input apparatuses are intended for the entering of discrete characters, not for concatenated characters such as the Arabic language or character strings in which characters written from right to left intermingle with those written from left right.

Specifically, Arabic documents or words are generally written from right to left in one stroke, except that numbers are written from left to right, differently from English letters, which are written from left to right. In addition, the form of each character changes, depending on whether it is at the beginning of, inside of, or at the end of the word. Furthermore, a series of specific characters changes into a single special character. Therefore, it is difficult to enter such characters using an electronic device.

SUMMARY OF THE INVENTION

Accordingly, the object of the present invention is to provide a character input apparatus which enables easy input management of character data using an electronic device, even in the case of a language such as the Arabic language, which uses concatenated characters, which requires modification according to the position of entered characters and which includes characters written from right to left intermingled with English letters and numbers written from left to right.

The foregoing object is accomplished by providing a character input apparatus comprising: character input means for entering characters; character pattern storage means for storing character change patterns according to where characters are in a character string; character storage means for storing the characters entered from the character input means; character reading means for reading the entered character and the preceding and succeeding characters from the character string data stored in the character storage means; character changing means for reading the character pattern corresponding to the entered character read by the character reading means from the character change patterns stored in the character pattern storage means, and changing the entered character and the preceding and succeeding characters stored in the character storage means; and display means for displaying the character pattern changed by the character changing means.

With this configuration, it is possible to enter characters exactly even in such a special language as the Arabic language.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIG. 2 is a table of the Arabic alphabet previously stored in the electronic pocket notebook;

DETAILED DESCRIPTION OF THE PREFERRED EMBODIMENTS

Referring to the accompanying drawings, an embodiment of the present invention will be explained.

Figure 1:
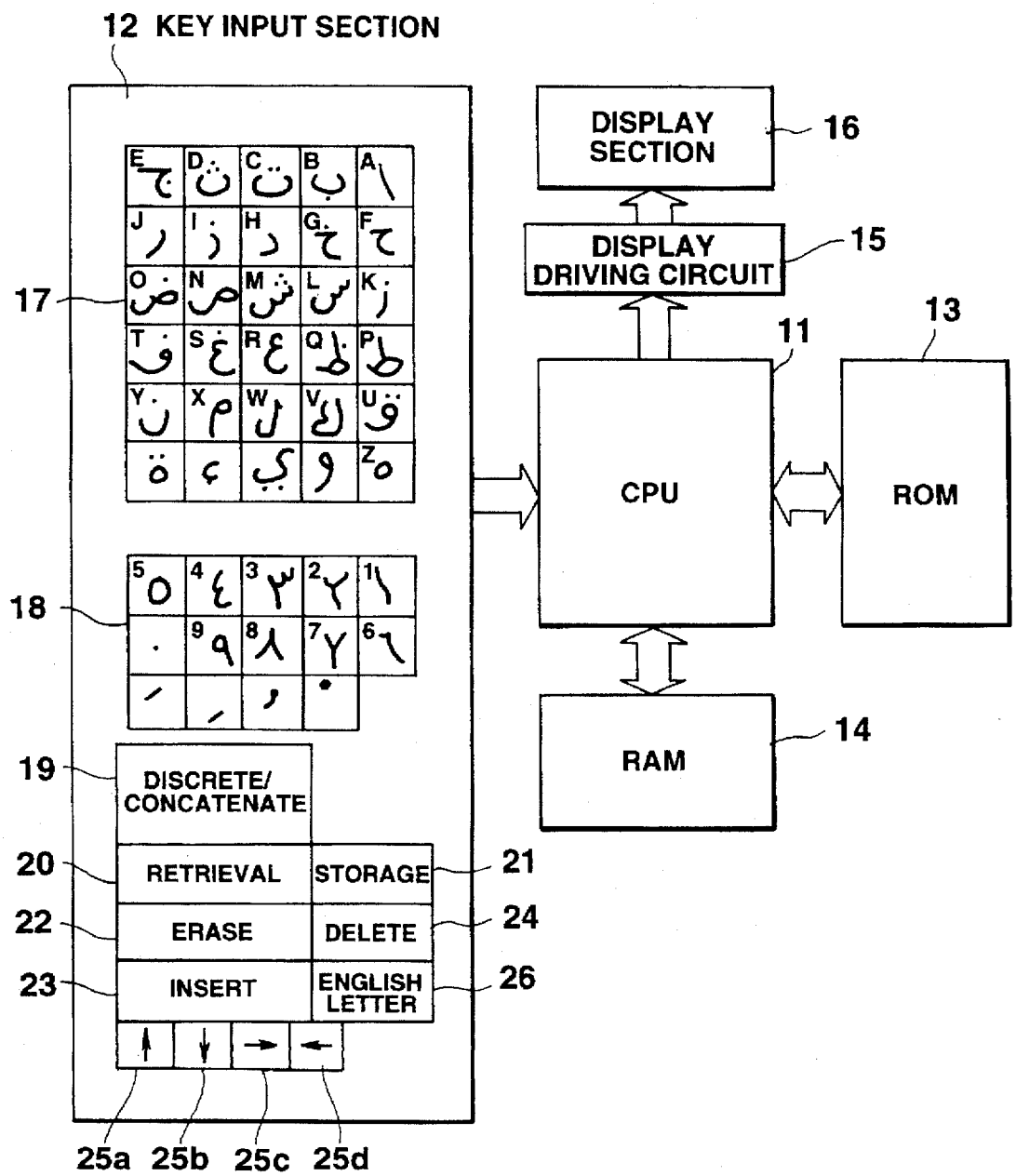
FIG. 1 is a block diagram of an electronic pocket notebook provided with an Arabic character input apparatus according to an embodiment of the present invention.

FIG. 1 is a block diagram of an electronic pocket notebook provided with an Arabic character input apparatus.

The electronic pocket notebook contains a CPU 11.

The CPU (central processing unit) 11 starts a system program previously stored in a ROM 13 in response to the key operation signal from a key input section 12 and controls the operation of each circuit. In addition to the key input section 12 and ROM 13, a RAM 14 is connected to the CPU 11, to which a dot matrix liquid-crystal display section 16 is also connected via a display driving circuit 15.

The key input section 12 comprises: character input keys 17 used to selectively enter the Arabic alphabet or the English alphabet; numeral input keys 18 used to selectively enter Arabic numerals or English numerals; a DISCRETE/ CONCATENATED input key 19 used to switch between the discrete input where each character is entered in the basic form or the concatenated input where individual characters are entered in the form of the word-beginning character, word-inside characters, and the word-end character in one stroke in the Arabic input mode; a RETRIEVAL key 20 used to retrieve the notebook data entered in the notebook data register of the RAM 14; a STORAGE key 21 used to enter key input data in the notebook data register of the RAM 14; an ERASE key 22 used to erase displayed data; an INSERT key 23 used to set the insert mode for the character string data displayed; a DELETE key 24 used to delete the character data displayed; cursor keys 25a to 25d used to specify the insert position or the data delete position on the liquid-crystal display section 16 in the insert mode; and an ENGLISH LETTER key 26 used to change to the English input mode.

In the ROM 13, a system program to control the operation of the present apparatus has been previously stored, and all the characters and font patterns that can be used in the electronic pocket notebook have also been stored in advance.

FIG. 2 is a table of the Arabic alphabet previously stored in the ROM 13 of the electronic pocket notebook.

The Arabic language has four types of forms, the basic form, the word-beginning form, the word-inside form, and the word-end form, for each character of the alphabet. In the discrete input mode, alphabet characters of the basic form are always selected. In the concatenated input mode, the word-beginning form, the word-inside form, or the word-end form of the entered character is selected, depending on whether the entered character is at the beginning of, inside of, or at the end of the word.

In the concatenated input mode, the word-end form is always used at the time when each character is entered, and then the character of the word-end form is converted into a suitable character form on the basis of the relationship between the entered character and the preceding and succeeding characters.

In the Arabic alphabet, when "ALIF" and "LĀM" are entered consecutively in combination form, regardless of what characters precede and succeed the combination, the combination of "ALIF" and "LĀM" is written as a predetermined special character "ALIF+LĀM". In this case, since "ALIF" and "TA'MARBOTA" are not concatenated to a subsequent character, the "ALIF+LĀM" has only the basic form and the word-end form.

In the Arabic language, text is composed of characters written from right to left. Thus, when English letters and numerals intermingle with Arabic text, only the English-letter and numeral portions are written from left to right.

Figure 3:
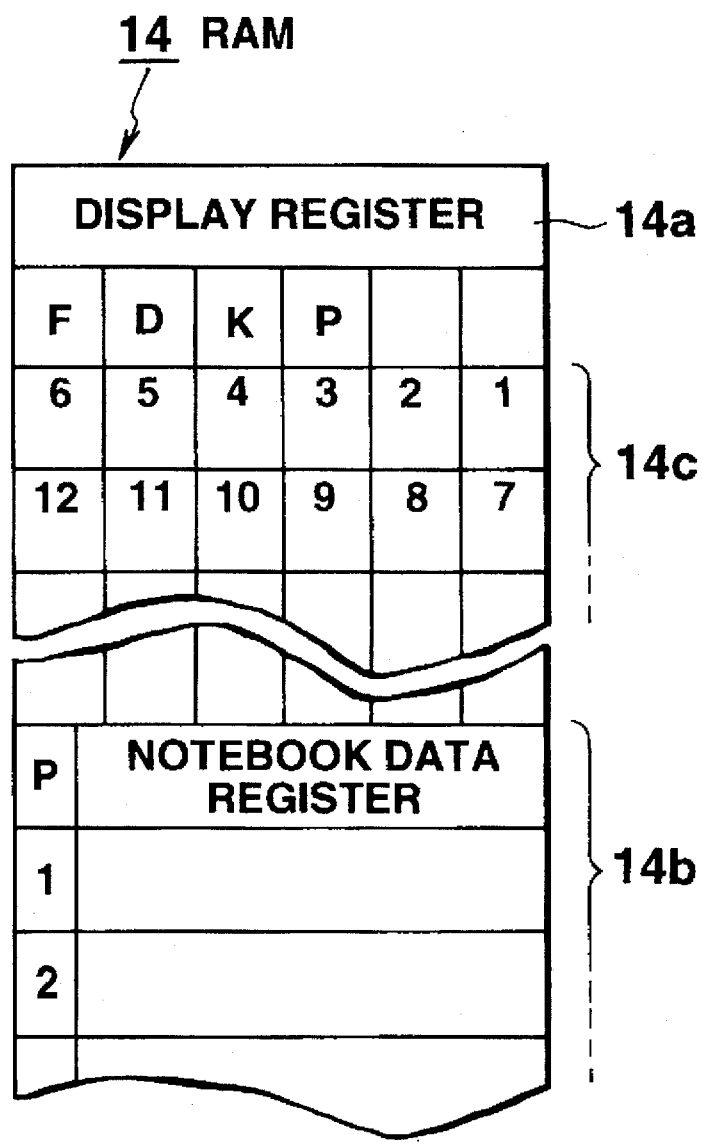
FIG. 3 shows the structures of various registers provided in the RAM of the electronic pocket notebook.

FIG. 3 shows the structures of various registers provided in the RAM 14 of the electronic pocket notebook.

The RAM 14 includes: a display register 14a in which the data to be displayed on the liquid-crystal display section 16 is written and which functions as a frame memory; a notebook data register 14b in which the data desired by the user, such as address data or schedule data, is entered and stored; a temporary storage section 14c in which the key input data is stored sequentially in the form of code data for each character of the input data; a mode flag register F which is selected in the mode selection at the ENGLISH LETTER key 26, is set at "1" in the Arabic input mode and at "0" in the English input mode; an input flag register D which switches between the discrete input process and the concatenated input process each time the DISCRETE/ CONCATENATE input key 19 is pressed, and is set at "1" in the discrete input process and at "0" in the concatenated input process; a numeral flag register K which is set at "1" when a numeral is entered from the numeral input keys 18; a pointer register P which indicates the write/read address for the notebook data register 14b.

In the input process of the Arabic language, English letters, and numerals, the font patterns read from the ROM 13 in accordance with the character code data sequentially written in the temporary storage 10 section 14c of the RAM 14 are written in the display register 14a, and displayed on the liquid-crystal display section 16 via the display driving circuit 15. In this case, the character data items serially written in the respective character code storage areas 14c1, 14c2, ... of the temporary storage section 14c are displayed from right to left on the liquid-crystal display section 16 during the input of the Arabic language.

Hereinafter, the operation of the electronic pocket notebook provided with the Arabic character input apparatus thus constructed will be explained.

Figure 4:
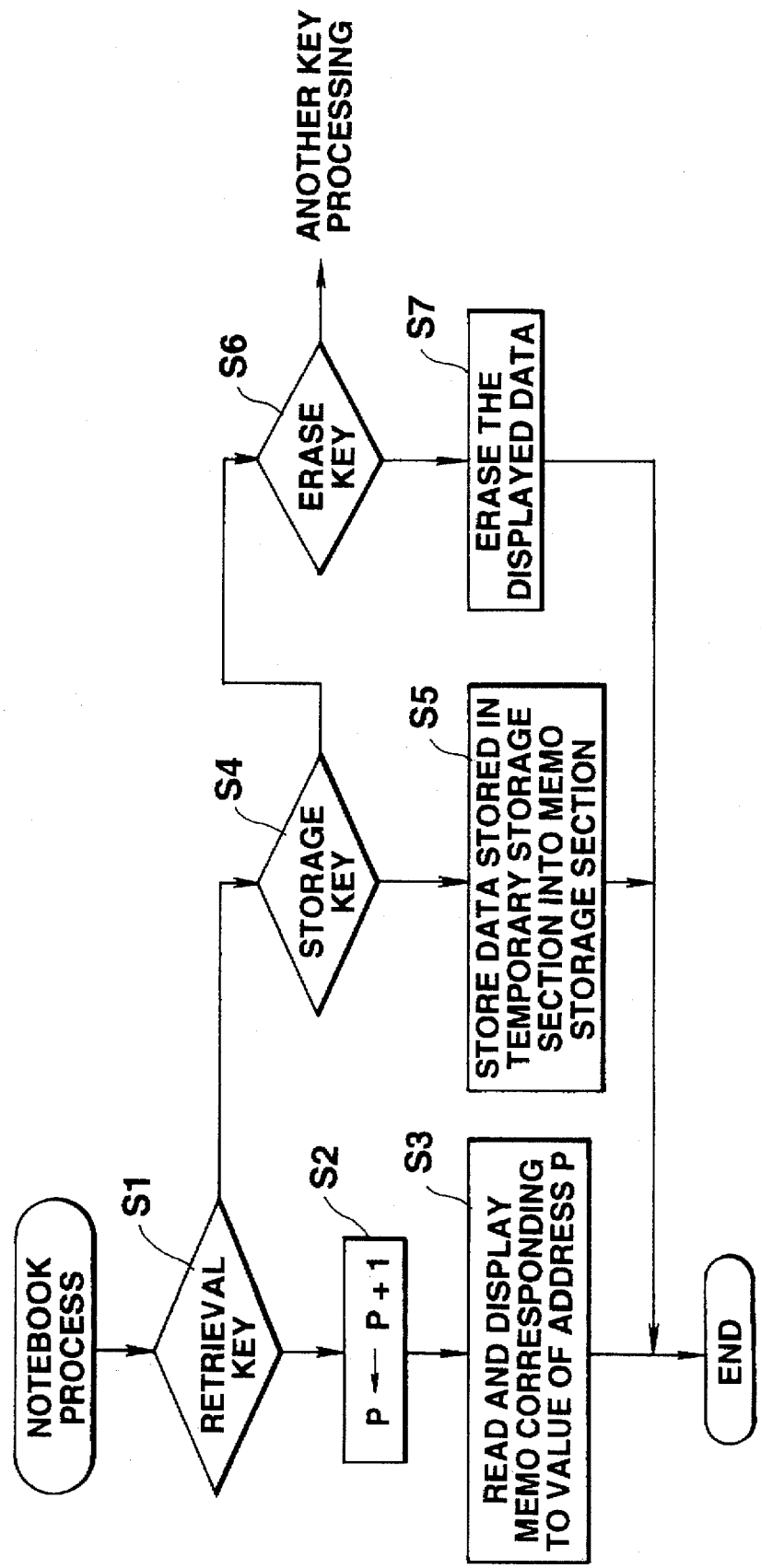
FIG. 4 is a flowchart for the notebook processing in the electronic pocket notebook.

FIG. 4 is a flowchart for the notebook processing in the electronic pocket notebook.

Specifically, with the notebook data including the address data and schedule data already stored in the notebook register 14b of the RAM 14, when the RETRIEVAL key 20 in the key input section 12 is pressed, the address P of the notebook data register 14b indicated by the pointer address P is updated, being incremented by one (+1) each time the RETRIEVAL key 20 is pressed. Then, the entered data items in the notebook data register 14b are retrieved one after another and displayed on the liquid-crystal display section 16 (step S1→S2, S3).

With the input data desired by the user displayed on the liquid-crystal display section 16 according to the operation of the character input keys 17 and numeral input keys 18 in the key input section 12, when the STORAGE key 21 is pressed, the key input data stored in the temporary storage section 14c of the RAM 14 in accordance with the displayed data on the liquid-crystal display section 16 is entered and stored in the notebook register 14b (step S4→S5).

With the retrieved data and key input data displayed on the liquid-crystal display section 16 after the retrieval display process of the data entered in the notebook data register 14b (steps S1 to S3) or the data input processing on the character input keys 17 or numeral input keys 18, as soon as the ERASE key 22 is pressed, the data displayed on the liquid-crystal display section 16 is all erased (step S6→S7).

Figure 5:
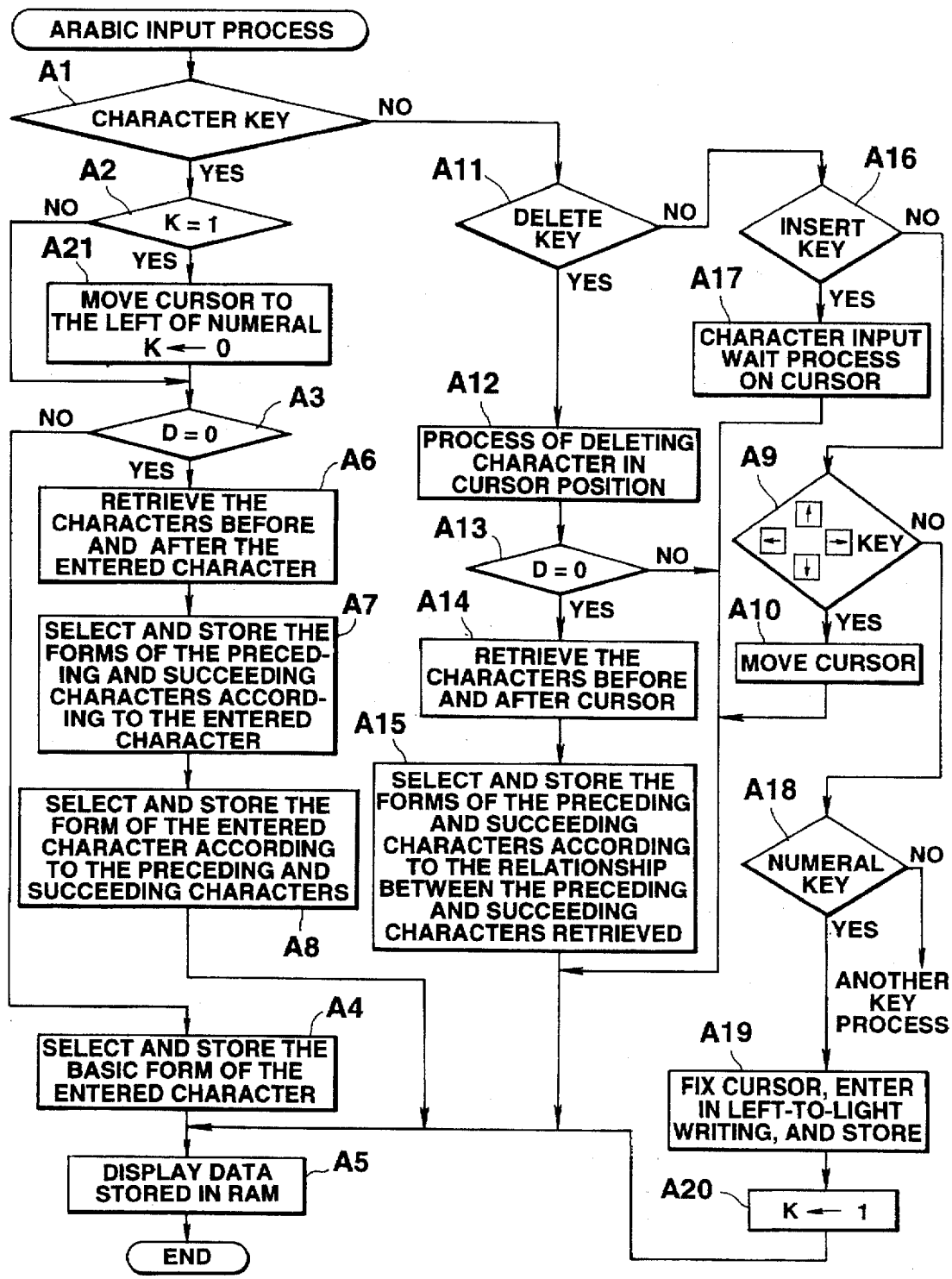
FIG. 5 is a flowchart for the Arabic input process in the electronic pocket notebook.

FIG. 5 is a flowchart for the Arabic input process in the electronic pocket notebook.

Specifically, in the Arabic input mode where the mode flag register F in the RAM 14 is set at "1", when one of the character input keys 17 in the key input section 12 is pressed, it is judged whether or not "1" is set in the numeral flag register K, that is, whether or not a numeral was just entered (step A1→A2).

When at step A2, it has been judged that "1" is not set, namely, that it is not a character entered immediately after a numeral was entered, it is judged whether or not "0" is set in the input flag register D, that is, whether or not the concatenated input mode is on (step A2→A3).

When at step A3, it has been judged that "0" is not set, namely, that the current mode is not the concatenated input mode, but the discrete input mode, the basic code of the Arabic character subjected to the input judgment at step A1 is selected and stored in the temporary storage section 14b of the RAM 14 (step A3→A4).

The font pattern for the Arabic character corresponding to the basic code stored in the temporary storage section 14b is read out from the ROM 13, written in the display register 14a, and displayed on the liquid-crystal display section 16 (step A5).

Thereafter, when the input processing of Arabic characters in the discrete input mode is repeated by pressing the character input keys 17 repeatedly, the basic character codes for the entered characters are stored in sequence in the temporary storage section 14c of the RAM 14. At the same time, the corresponding patterns are read sequentially from the ROM 13 and displayed on the liquid-crystal display section 16 in such a manner that they seem to be written from right to left (step A1 to A5).

When at step A3, it has been judged that "0" is set, namely, that the current input mode is the concatenated input mode, the characters entered before and after the Arabic character subjected to the input judgment at step A1 will be retrieved from the key input data items stored in the temporary storage section 14c of the RAM 14 (step A3→A6).

When the currently key-entered character is a beginning character, both of the preceding and succeeding characters are retrieved as spaces, when the currently key-entered character is the second or later one in the sequentially entered characters, the character before the currently entered character is retrieved as the preceding input character and the character after the currently entered character is retrieved as a space, when the currently entered character is an inserted character, both of the characters before and after the currently entered character are retrieved as specific characters.

After the characters before and after the currently entered key input character have been retrieved, the forms of the preceding input character and the succeeding input character are selected according to the relationship between the currently entered character and the preceding input character and the relationship between the currently entered input and the succeeding input character, and are stored in the temporary storage section 14c of the RAM 14 to update its contents (step A7).

Furthermore, the form of the current input character is selected according to the relationship between the current input character and the preceding and succeeding input characters. The selected form is stored in the corresponding position of the temporary storage section 14c in the RAM 14 (step A8).

Specifically, in the Arabic concatenated input mode, when the current key input character is a word-beginning character and the preceding and succeeding characters retrieved are spaces, it is determined to be a word-beginning character because the preceding character is a space, and then is stored in word-beginning form (steps A7, A8).

When the current key input character is the second or later one in the sequentially entered characters, the retrieved character before the current input character is the preceding input character and the retrieved character after the current input character is a space, the form of the preceding input character is changed from the word-end form to the word-beginning form or the word-inside form and stored, and the succeeding character retrieved, or a space, remains unchanged (step A7). Then, the current input character is stored in word-end form (step A8). However, when the current input character is related to the preceding input character in a combination of "LĀM"+"ALIF", the combination is changed into a single character "LĀM+ALIF" (see FIG. 2), which is stored in the temporary storage section 14c of the RAM 14 (steps A7, A8).

When the current key input character is an inserted character and the retrieved characters before and after the current input character are both specific characters, the preceding input character is of the word-beginning form or the word-inside form and the succeeding input character is of the word-end form or the word-inside form. Therefore, both of the preceding and succeeding characters undergo no form change and remain unchanged (step A7). Then, the current input character is stored in word-inside form (step A8). However, when the current input character is related to the preceding input character in a combination of "LĀM"+"ALIF", the combination is changed into a single character "LĀM +ALIF" (see FIG. 2), and the form of the succeeding input character is changed into the word-beginning form. The single character and the word-beginning form input character are stored in the temporary storage section 14c of the RAM 14 (steps A7, A8).

When at steps A6 to A8, the forms of the preceding and succeeding characters are selected according to the relationship between the current input character and the preceding and succeeding characters, and the selected forms are stored in the temporary storage section 14c, and when the form of the current input character is selected and stored, the font patterns for the Arabic characters corresponding to the character codes of the stored respective forms (word-beginning form, word-inside form, and word-end form) are read from the ROM 13, written into the display register 14a, and displayed on the liquid-crystal display section 16 (step A5).

With an Arabic character string stored in the temporary storage section 14c and displayed on the liquid-crystal display section 16 as a result of the character input process in the discrete input mode or the concatenated input mode on the character input keys 17, the cursor is moved to a given character position by pressing the cursor keys 25a to 25d (step A9→A10). Thereafter, when the DELETE key 24 is pressed, the character in the cursor position is deleted (step A11→A12).

Then, on the basis of the input flag register D in the RAM 14, it is judged whether or not the concatenated input mode (D=0) is on (step A13).

When at step A13, it has been judged that the concatenated input mode is not on, namely that the Arabic character string displayed in the character input process has been entered in the discrete input mode, the form of each character is stored and displayed in the basic form. Therefore, the form of each character need not be changed according to the relationship between a character and the preceding and succeeding characters after deletion. As a result, the basic-form letter specified for deletion is simply deleted and the result is displayed on the liquid-crystal display section 16 (step A13→A5).

When at step A13, it has been judged that the concatenated input mode is on, namely that the currently displayed Arabic character string has been entered in the concatenated input mode, the preceding and succeeding characters corresponding to the cursor positions after deletion are retrieved from the temporary storage section 14c of the RAM 14. The forms of the preceding and succeeding characters are selected according to the relationship between the preceding character and the succeeding character, and stored in the temporary storage section 14c to update its contents (step A13→A14, A15).

Figure 6A:
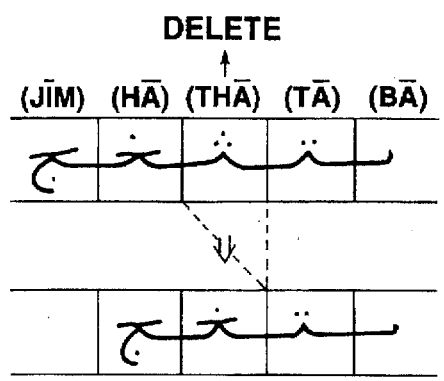
FIGS. 6A and 6B show two examples of the character deleting process associated with the Arabic input process in the electronic pocket notebook.
Figure 6B:
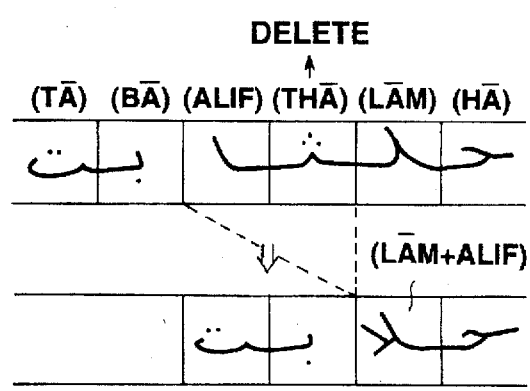

FIGS. 6A and 6B show two examples of the character deleting process associated with the Arabic input processing in the electronic pocket notebook.

As shown in FIG. 6A, in the case of an Arabic character string of "BĀ", "TĀ", "THĀ", "HĀ" and "JĪM" entered consecutively in that order, when the cursor is moved to "TH Ā" and the DELETE key 24 is pressed, the delete-specified character "THĀ" is deleted, and at the same time, the preceding and succeeding characters "TĀ" and "HĀ" are retrieved, and their character forms are selected according to the relationship between them.

In this case, even if the preceding and succeeding characters "TĀ" and "HĀ" are concatenated characters, since both of them remain in the inside of the word and contain no special combination, they remain unchanged in the word-inside form, and only "THĀ" alone is deleted on the display.

As shown in FIG. 6B, in the case of an Arabic character string of "HĀ", "LĀM", "THĀ", and "ALIF" entered consecutively in that order, when the cursor is moved to "TH A̅" and the DELETE key 24 is pressed, the delete-specified character "THA̅" is deleted, and at the same time, the preceding and succeeding characters "LA̅M" and "ALIF" are retrieved, and their character forms are selected according to the relationship between them.

In this case, a combination of "LA̅M"+"ALIF" is changed into a single-character word-end pattern "LA̅M+ALIF", which is stored in the temporary storage section 14c of the RAM 14 so as to follow the "HA̅", and which is also displayed on the liquid-crystal display section 16 to update the previous representation.

With an Arabic character string stored in the temporary storage section 14c of the RAM 14 and displayed on the liquid-crystal display section 16 as a result of the character input process in the discrete input mode or the concatenated input mode on the character input keys 17, the cursor is moved to a given character position by pressing the cursor keys 25a to 25d (step A9→A10). Thereafter, when the INSERT key 23 is pressed, the character string data items in and after the cursor-specified position are shifted backward by one character within the temporary storage section 14c, and control waits for an inserted character to be entered (step A16→A17).

Then, when an Arabic character is entered by pressing the character input keys 17, it has been judged on the basis of the numeral flag register K (="0") that the character has not been entered after a numeral input. Thereafter, on the basis of the input flag register D, it is judged whether or not the concatenated input mode is on (step A1→A2→A3).

When at step A3, it has been judged that the concatenated input mode is not on, namely that the current input mode is the discrete input mode, the inserted character subjected to the input judgment at step A1 is selected for the basic form. The basic-form character is stored in the input wait position of the temporary storage section 14c set at step A17, and the Arabic character string after insertion is read from the ROM 13 and displayed on the liquid-crystal display section 16 (step A3→A4, A5).

When at step A3, it has been judged that the concatenated input mode is on, namely that the current input mode is the concatenated input mode, control proceeds to the steps A6 to A8, where the characters before and after the inserted character are retrieved, the forms of the preceding and succeeding characters are selected according to the relationship between the inserted character and the preceding and succeeding characters, and stored in the temporary storage section 14c to update the contents, and the form of the inserted character is also selected and stored.

Figure 7A:
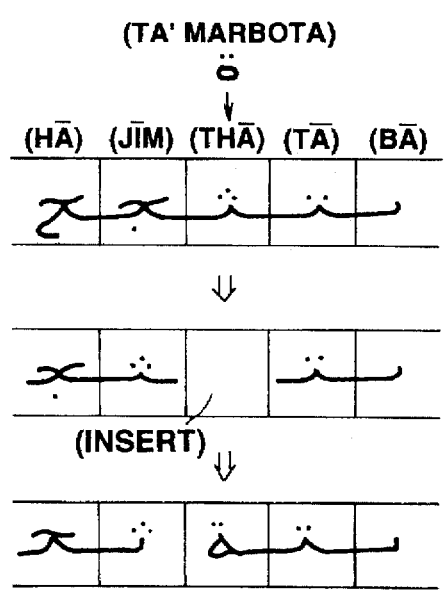
FIGS. 7A, 7B and 7C show three examples of the character inserting process associated with the Arabic input process in the electronic pocket notebook.
Figure 7B:
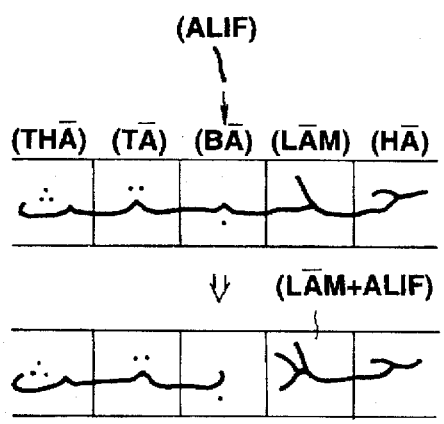
Figure 7C:
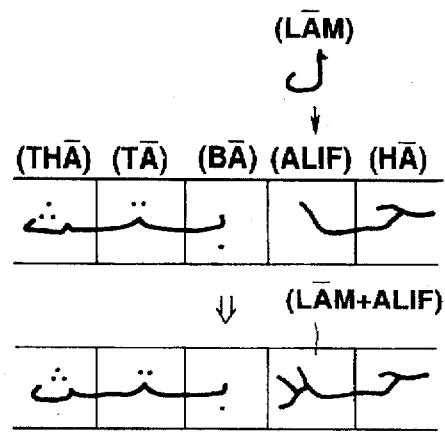

FIGS. 7A to 7C shows three examples of the character inserting process associated with the Arabic input processing in the electronic pocket notebook.

As shown in FIG. 7A, in the case of an Arabic character string of "BA̅", "TA̅", "THA̅", "JI̅M", and "HA̅" consecutively entered in that order, when the cursor is moved to the position of character "THA̅" to insert "THA̅" before "TA'MARBOTA", and the INSERT key 23 is pressed, the character string on and after "THA̅" are shifted backward (left) by one character to set the input wait position, and its preceding and succeeding characters "TA̅" and "THA̅" are retrieved. Then, the previously entered character "T'MARBOTA" is not changed and remains in the word-inside form according to the relationship between the inserted character "T'MARBOTA" and the preceding input character "TA̅" and the succeeding input character "TH A̅". At the same time, the succeeding input character "TH A̅" is selected for the word-beginning form because of the rule that the inserted character "T'MARBOTA" is not concatenated to a subsequent character, and the beginning-form character is stored in the temporary storage section 14c to update its contents. Then, the inserted character "T'MARBOTA" is selected for the word-end form and stored in the input wait position of the temporary storage section 14c.

As shown in FIG. 7B, in the case of an Arabic character string of "HA̅", "LA̅M", "BA̅", "TA̅", and "THA̅" consecutively entered in that order, when "ALIF" is inserted before "BA̅", the preceding and succeeding characters "LA̅M" and "BA̅" are retrieved. Then, on the basis of the relationship between the inserted character "ALIF" and the preceding character "LA̅M" and between the inserted character and the succeeding character "BA̅", the preceding input character "LA̅M" is combined with the inserted character "ALIF" and selected as a single-character word-end form "ALIF+LA̅M", which is stored in the temporary storage 14c to update its contents. The succeeding input character "BA̅" is selected for the word-beginning form because of the rule that the inserted character "ALIF" is not concatenated to a subsequent character, and the beginning-form character is stored in the temporary storage section 14c to update its contents.

As shown in FIG. 7C, in the case of an Arabic character string of "HA̅", "ALIF", "BA̅""TA̅", and "THA̅ consecutively entered in that order, when "LA̅M" is inserted before "ALIF", the preceding and succeeding characters "HA̅" and "ALIF" are retrieved. Then, on the basis of the relationship between the inserted character "LA̅M" and the preceding character "HA̅" and between the inserted character and the succeeding character "ALIF", the preceding input character "HA̅" is not changed and remains in the word-beginning form and the succeeding input character is combined with the inserted character "LA̅M" and selected as a single-character word-end form "ALIF+LA̅M", which is stored in the temporary storage 14c to update its contents.

After Arabic characters have been entered in sequence in the temporary storage section 14c of the RAM 14 by pressing the character input keys 17, the character string data is displayed on the liquid-crystal display section 16 in such a manner that they seem to be written from right to left, for example. In this state, when a numeral is entered from the numeral input keys 18, the cursor specify position is fixed at the input wait position for a subsequent character following the word end of the Arabic character string. Each time a numeral data item is entered, it is written in the fixed input wait position, and the numeral data item previously written in the same wait position is shifted backward (left) and written (step A18→A19).

Specifically, when a numeral is entered from the numeral keys 18, the entered numeral data item is written in the temporary storage section 14c and liquid-crystal display section 16 in such a manner that they are shifted left by one to the left of the fixed cursor position each time a numeral is entered. This enables number data to be written from left to right.

When a numeral is entered from the numeral key 18, "1" indicating that a numeral is being loaded into the numeral flag register K is set (step A20).

In this way, with a numeral entered in a left-to-right writing manner following a right-to-left written Arabic character string, when the Arabic character input processing is started again by pressing the character input keys 17, the cursor position in the fixed state at step A19 is moved to the left of the entered numeral string on the basis of the judgment that "1" is set in the numeral flag register K, namely that a numeral was just entered, and control waits for a subsequent Arabic character to be entered (step A1→A2→A21).

This causes the newly entered Arabic characters to be written from right to left in the temporary storage section 14c of the RAM 14 via the steps A3 to A8, and to be displayed on the liquid-crystal display section 16.

With the electronic pocket notebook provided with the Arabic character input apparatus thus constructed, when an Arabic character is entered from the character input keys 17 with the DISCRETE/CONCATENATE input key 19 in the key input section 12 set in the concatenated input mode, the characters before and after the entered character are retrieved from the entered character data stored in the temporary storage section 14c of the RAM 14. The forms of the preceding and succeeding characters and the form of the entered character are selected from the word-beginning form, the word-inside form, and the word-end form, or the combined character of "ALIF"+"LĀM", and are stored in the temporary storage section 14c to update its contents. At the same time, the font patterns for the Arabic character string stored in the temporary storage section 14c are read from the ROM 13 and displayed on the liquid-crystal display section 16 in a right-to-left writing manner. Therefore, even in the case of the Arabic language where character form changes, depending on where the entered character is in text or a word, Arabic characters can be entered easily as notebook data, stored in the RAM 14, and managed.

When a numeral is entered from the numeral input keys 18, the cursor indicating the key input position is fixed at the next input position following the Arabic character string. Numeral data items consecutively entered are shifted left at the cursor position and written from left to right. When Arabic characters start to be entered again, the cursor position is moved to the left of the entered numeral data and a consecutive new character position is indicated. This enables right-to-left written character data items and left-to-right written character data items to be entered in a mixing manner easily and managed as notebook data.

In the embodiment, when a numeral is entered during the input of left-to-right written Arabic characters, the cursor is fixed, thereby enabling right-to-left writing. Another configuration may be used in the present invention. For instance, in the English input (left-to-right writing) mode set at the ENGLISH LETTER key 26, by setting the Arabic input mode during English input, the left-to-right written English language may be intermingled with the right-to-left written Arabic language.

Specifically, when in the English input mode, the Arabic input mode is set, the cursor has only to be fixed and characters have only to be entered in a right-to-left writing manner as in the previous embodiment.

Figure 8:
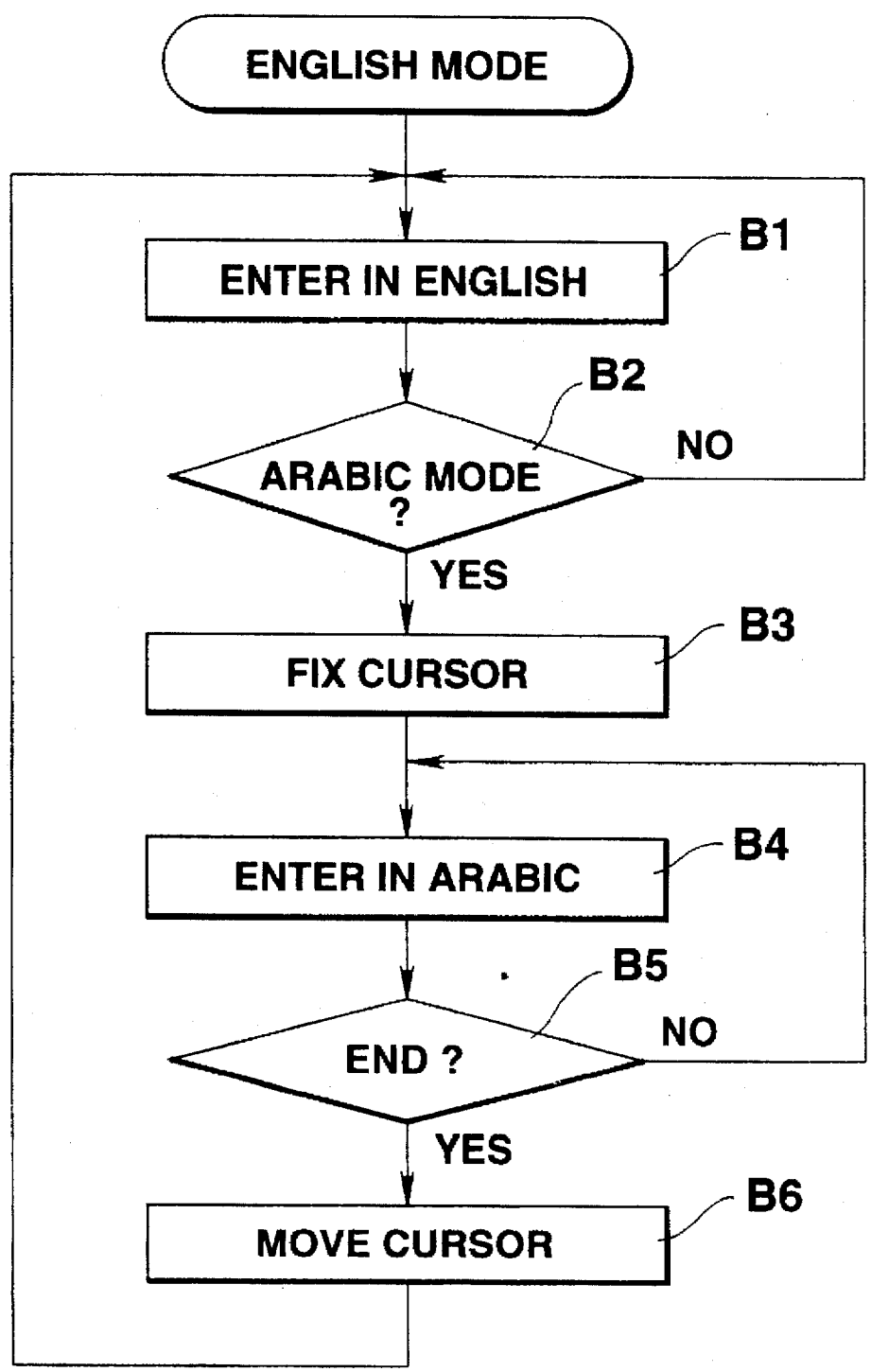
FIG. 8 is a flowchart for the Arabic language input process in the English input mode in the electronic pocket notebook.

FIG. 8 is a flowchart for the Arabic input process in the English input mode in the electronic pocket notebook.

With the English input mode set on the ENGLISH LETTER key 26, as English letters are entered from the character input keys 17, the cursor indicating the input position is moved right (step B1). When the Arabic input mode is set (step B2) after the ENGLISH LETTER key 26 has been pressed again, for example, the cursor position is fixed in the input position to the right of the English character string (step B3). A subsequently entered Arabic character is written in the fixed position in such a manner that they seem to be written from right to left, while the preceding input character is shifted right one by one (step B4).

When the mode is returned to the English input mode by pressing the ENGLISH LETTER key 26 again (step B5), the cursor is moved to the right of the entered Arabic character string, and thereafter, the English input processing can be continued (step B6).

In this case, at steps B5 and B6, when the Arabic input mode is terminated, the cursor is moved to the right of the entered Arabic character string. Thereafter, English characters are entered in the same manner that, after a numeral has been entered, the cursor is moved to the left of the entered numeral in the previous embodiment.

The invention may be practiced or embodied in still other ways without departing from the spirit or essential character thereof For instance, applications to special langauges other than the Arabic gauge are, of course, included in the invention.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A character input apparatus comprising:

character writing selection means for selectively switching between a right-to-left input state for a right-to-left character writing manner in which characters are written from right to left, and a left-to-right input state for a left-to-right character writing manner in which characters are written from left to right;

a character input device for successively inputting characters;

a character display device for displaying the successively input characters;

right-to-left character writing display control means for controlling said character display device to shift an already displayed preceding input character in a rightward direction and to display a succeeding input character at a position leftward of the shifted preceding input character in a case where the right-to-left input state is selected by said character writing selection means and when the succeeding character is input with respect to the already displayed preceding input character after the right-to-left input state has been selected by said character writing selection means;

left-to-right character writing display control means for controlling said character display device to display the succeeding input character at a position rightward of the shifted preceding input character in a case where the left-to-right input state is selected by said character writing selection means and when the succeeding character is input with respect to the already displayed preceding input character after the left-to-right input state has been selected by said character writing selection means.

2. A character input means according to claim 1, further comprising:

cursor display means for displaying a cursor on the character display device to indicate a position at which a character is to be input; and cursor control means for moving the cursor displayed by said cursor display means successively rightward when characters are input by said character input means in the case where the left-to-right input state is selected by said character writing selection means, and for fixing the position of the cursor when characters are input by said character input means in the case where the right-to-left input state is selected by said character writing selection means.

3. A character input apparatus according to claim 2, further comprising:

cursor moving means for moving the cursor displayed by said cursor display means to a position rightward of a character displayed on said character display device when the left-to-right input state is selected by said character writing selection means after one or more characters have been input and displayed in the right-to-left input state.

4. A character input apparatus according to claim 1, wherein said characters written from right to left are Arabic language characters and wherein said character input apparatus further comprises:

a character pattern storage device for storing a plurality of display patterns for each character of the Arabic language;

pattern reading means for reading from said character pattern storage device a character pattern which corresponds to a position of an input character when the character is input by said character input means after the right-to-left input state has been selected by said character writing selection means; and character pattern display means for displaying the character pattern read by said pattern reading means.

5. A character input apparatus according to claim 4, wherein said pattern reading means includes associated pattern reading means for reading from said character pattern storage device at least the preceding input character in association with the succeeding input character, together with the succeeding input character.

6. A character input apparatus comprising:

character writing selection means for selectively switching between a right-to-left input state for a right-to-left character writing manner in which characters are written from right to left, and a left-to-right input state for a left-to-right character writing manner in which characters are written from left to right;

a character input device for successively inputting characters;

a character display device for displaying the successively input characters;

left-to-right character writing display control means for controlling said character display device to shift an already displayed preceding input character in a leftward direction and to display a succeeding input character at a position rightward of the shifted preceding input character in a case where the left-to-right input state is selected by said character writing selection means and when the succeeding character is input with respect to the already displayed preceding input character after the left-to-right input state has been selected by said character writing selection means;

right-to-left character writing display control means for controlling said character display device to display the succeeding input character at a position leftward of the shifted preceding input character in a case where the right-to-left input state is selected by said character writing selection means and when the succeeding character is input with respect to the already displayed preceding input character.

7. A character input means according to claim 6, further comprising:

cursor display means for displaying a cursor on the character display device to indicate a position at which a character is to be input; and cursor control means for moving the cursor displayed by said cursor display means successively leftward when characters are input by said character input means in the case where the right-to-left input state is selected by said character writing selection means, and for fixing the position of the cursor when characters are input by said character input means in the case where the left-to-right input state is selected by said character writing selection means.

8. A character input apparatus according to claim 7, further comprising:

cursor moving means for moving the cursor displayed by said cursor display means to a position leftward of a character displayed on said character display device when the right-to-left input state is selected by said character writing selection means after one or more characters have been input and displayed in the left-to-right input state.

9. A character input apparatus according to claim 6, wherein said characters written from right to left are Arabic language characters and wherein said character input apparatus further comprises:

a character pattern storage device for storing a plurality of display patterns for each character of the Arabic language;

pattern reading means for reading from said character pattern storage device a character pattern which corresponds to a position of an input character when the character is input by said character input means after the right-to-left input state has been selected by said character writing selection means; and character pattern display means for displaying the character pattern read by said pattern reading means.

10. A character input apparatus according to claim 9, wherein said pattern reading means includes associated pattern reading means for reading from said character pattern storage device at least the preceding input character in association with the succeeding input character, together with the succeeding input character.

11. A recording medium storing a program for controlling a computer, said computer being coupled to a character input device for successively inputting characters and a display device for displaying the successively input characters, and said program controlling said computer to function as:

mode selection means for setting one of a right-to-left input state for a right-to-left character writing manner in which characters are written from right to left, and a left-to-right input state for a left-to-right character writing manner in which characters are written from left to right;

right-to-left character writing display control means for controlling said character display device to shift rightward an already displayed preceding input character input when said right-to-left input state was not set, and to display a succeeding input character at a position leftward of the shifted preceding input character in a case where the right-to-left character input mode is set by said mode selection means; and left-to-right character writing display control means for controlling said character display device the succeeding input character at a position rightward of the preceding input character in a case where the left-to-right character input mode is set by said mode selection means.

12. A recording medium storing a program for controlling a computer, said computer being coupled to a character input device for successively inputting characters and a display device for displaying the successively input characters, and said program controlling said computer to function as:

mode selection means for setting one of a right-to-left input state for a right-to-left character writing manner in which characters are written from right to left, and a left-to-right input state for a left-to-right character writing manner in which characters are written from left to right;

left-to-right character writing display control means for controlling said character display device to shift leftward an already displayed preceding input character input when said right-to-left input state was not set, and to display a succeeding input character at a position rightward of the shifted preceding input character in a case where the left-to-right character input mode is set by said mode selection means; and right-to-left character writing display control means for controlling said character display device the succeeding input character at a position leftward of the preceding input character in a case where the right-to-left character input mode is set by said mode selection means.

* * * * *